United States Patent

Vela et al.

Patent Number: 5,722,306
Date of Patent: Mar. 3, 1998

[54] METHOD FOR MAKING A PELLETIZER KNIFE AND BLANK

[75] Inventors: Timothy M. Vela, Montgomery, N.Y.; David H. Atkinson, Oradell, N.J.

[73] Assignee: Alloy Technology International Inc., West Nyack, N.Y.

[21] Appl. No.: 477,601

[22] Filed: Jun. 7, 1995

[51] Int. Cl.⁶ .................................................. B21K 21/00
[52] U.S. Cl. ........................ 76/101.1; 228/160; 419/8
[58] Field of Search ................................. 228/160, 176; 419/9, 8; 76/101.1, 115, 112, 107.8, 106.5, 104.1

[56] References Cited

U.S. PATENT DOCUMENTS

| | | | |
|---|---|---|---|
| 2,330,138 | 9/1943 | Nickle et al. | 76/115 X |
| 2,335,249 | 11/1943 | Hawkins | 76/115 X |
| 3,882,579 | 5/1975 | Peacock | 76/115 X |
| 4,252,102 | 2/1981 | Phaal et al. | 76/115 X |
| 4,428,260 | 1/1984 | Eby | 76/104.1 X |
| 4,670,215 | 6/1987 | Morishita et al. | 419/9 |
| 4,704,336 | 11/1987 | Spriggs | 428/552 |
| 4,719,076 | 1/1988 | Geczy et al. | 419/8 |
| 4,729,789 | 3/1988 | Ide et al. | 75/244 |
| 4,904,538 | 2/1990 | Juhas | 428/552 |
| 4,917,961 | 4/1990 | Tsujii et al. | 428/552 |
| 5,194,237 | 3/1993 | Cliche et al. | 423/440 |
| 5,294,399 | 3/1994 | Akiyama | 419/27 |
| 5,366,138 | 11/1994 | Vela et al. | 228/176 |
| 5,448,828 | 9/1995 | Willems et al. | 29/899.1 |

*Primary Examiner*—Rinaldi I. Rada
*Assistant Examiner*—Boyer Ashley
*Attorney, Agent, or Firm*—Donald D. Mon

[57] ABSTRACT

A method to produce a composite blank for a knife blade and, to produce knife blades from it. Each half of a pair of substrate halves has a groove filled with a powdered titanium carbide based metal matrix composite (Fe/TiC). It is placed in a metal container which is sealed, evacuated, and subjected to hot isostatic pressing (HIP) to cause the powder to sinter and bond to the halves. The container is cooled and removed from the contents. The metal halves are separated, and sliced to form the blanks, and the blanks are sharpened to form the knife blades.

8 Claims, 4 Drawing Sheets

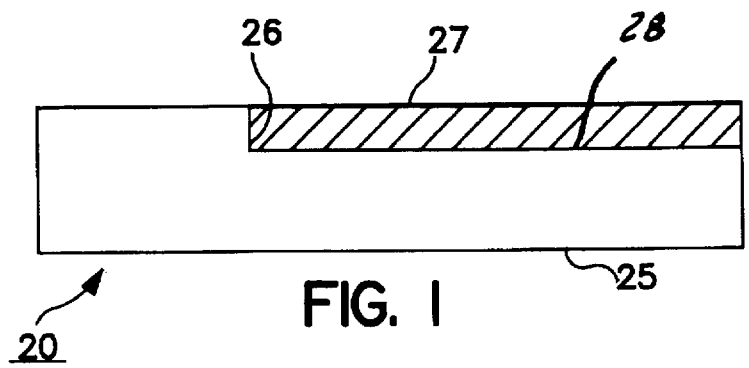
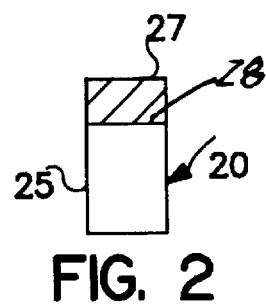
FIG. 1  FIG. 2
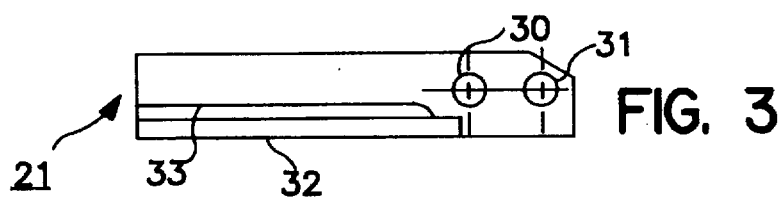
FIG. 3
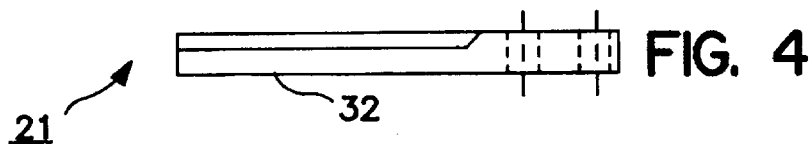
FIG. 4
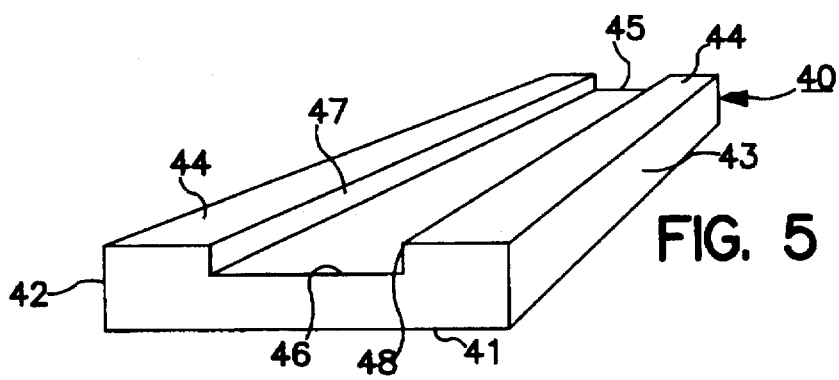
FIG. 5
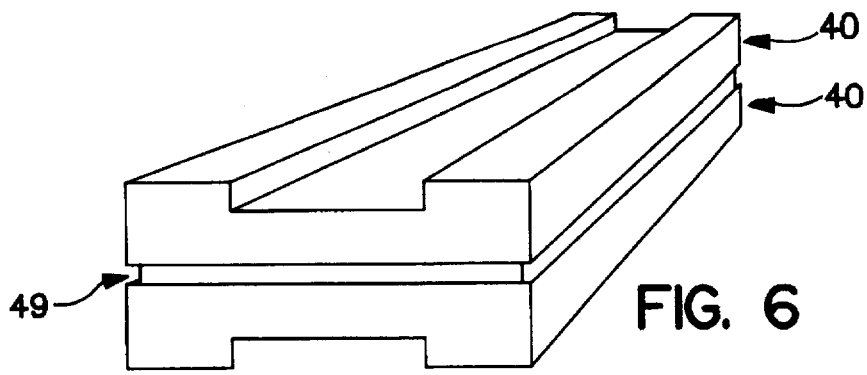
FIG. 6

METHOD FOR MAKING A PELLETIZER KNIFE AND BLANK

FIELD OF THE INVENTION

A pelletizer knife for cutting pellets from extruding strands of plastic material and a blank and method for making them, including hot isostatic pressuring (HIP).

BACKGROUND OF THE INVENTION

Billions of pounds of polyethylene and polypropylene are processed into pellet form annually. The pelletizing operation is accomplished with three basic components: an extruder, a die and body with a wear resistant surface, and knives. This invention relates to knives for this equipment, to a method for making a knife blank, and to the method of making a knife from the blank.

The extruder's function is to melt the various plastics and homogeneously mix additives into this melt. This melt is then forced through the die under very high pressure. Pre-drilled holes in the die create strands of the melt which solidify as they contact a water environment which surrounds the die body.

The die face materials, and the materials of the knives which pass along the die face play a critical role in determining the productivity and profitability of this extrusion process. These materials must be hard, wear resistant, and easily repaired or replaced in order to allow for multiple use of the intricate and expensive die body. They must also be corrosion resistant, possess a combination of temper resistance, thermal shock resistance and low thermal conductivity.

Titanium carbide based metal matrix composites ("Fe/TiC" herein) are the ideal alloy for these uses. In addition to meeting the foregoing criteria, these composites have a very significant advantage in the reduction of wear between the knives and the die face. This is because the titanium carbides in the composite are smooth and rounded. This provides a slippery surface which greatly reduces the rubbing wear.

There are other favorable consequences. The low coefficient of friction means that less force is required to rotate the knives against the die face. In turn, less heat is generated at the face of the die. These reduce the energy consumption.

Interestingly, titanium carbide composites are almost 2½ times less dense than other alloys which are sometimes used, for example WC-Co alloys. Heat transfer ratio is proportional to the density of a material. It follows that an additional reduction in energy consumption will be realized because less heat is transferred to the water which surrounds the die face when Fe/tic composites are used.

As a consequence of the foregoing, it has become an industry standard to make the knife from a titanium carbide based metal matrix. The disadvantage of solid titanium carbide based composites is that they are inherently brittle, and are liable to be broken under some conditions of usage. Downtime for the machine becomes very expensive.

Breakage of these knives most often occurs as a result of an occurrence commonly referred to as "trash out". This is the extrusion of substandard or irregular product ("trash") which usually occurs on start-up or shutdown of the extruder line. The trash is hard and difficult to cut, and puts a great deal of strain on the knives. Because the knife material is brittle, the knife sometimes breaks.

It is an object of this invention to provide a knife with a titanium carbide based cutting edge that will survive trash outs. In fact, in some cases knives according to this invention have survived intact when the bolts which held them in place were sheared off by excessive overloading.

Providing a support strong enough to drive and reinforce a titanium carbide metal composite is not a simple task. In order to provide a suitable knife, the cutting element must be integral with the support. Some alloys such as WC/Co can be silver soldered or brazed to a base, but this is not possible with titanium carbide based composites. Customarily a sophisticated vacuum brazing process carried out at a very high temperature is used, but the success rate is unpredictable, and the bonding is often non-uniform or incomplete.

It is an object of this invention to provide a blank from which a knife according to this invention can be made, that regularly produces a reliable product which when formed into knives provides the enumerated advantages.

BRIEF DESCRIPTION OF THE INVENTION

This invention takes advantage of the process taught in Vela et al U.S. Pat. No. 5,366,138, issued Nov. 22, 1994. This patent is incorporated herein in its entirety by reference for teaching of this process.

An appropriately shaped steel substrate is placed in an evacuable metal container along with a charge of Fe/TiC material in powdered form. The container is sealed and evacuated. It is thereafter subjected to hot isostatic pressing ("HIP" herein") in a pressure vessel usually filled with argon gas. The pressure inside the vessel is increased, usually to about 15,000 psi, and the temperature raised to about 2,400 degrees F.

As a consequence the container is strongly pressed against its contents. The temperature and pressure are maintained for a suitable time to assure sintering of the charge and bonding it to the substrate. The container is distorted as the volume of the powder decreases due to the sintering of the charge.

The container is removed from the vessel and cooled. It is thereafter machined away, leaving a solid body consisting of the metal substrate and the sintered material.

More importantly, the sintered material has formed a strong reliable and durable bond with the substrate. Such a bond could not have been made by soldering or brazing, and only with great difficulty by vacuum brazing, the latter with results that were often unreliable and uncertain.

According to this invention, a pair of substrate halves are formed each with a central groove on one face, disposed between two shoulders. These are placed back to back, and the grooves are filled with Fe/TiC powder charge. The two halves with their respective charges are loaded into a container which is evacuated, sealed, and subjected to HIP.

The halves are separated. They are cleaved down the center of their grooves, and are then sliced to form blanks having a metallic base and a Fe/TiC knife edge bonded to them.

According to a preferred but optional feature of the invention, a layer of ceramic powder is placed between the substrate halves while in the container. This eliminates the need to saw the substrate halves apart if they were bonded together during the HIP process. The ceramic will not bond to either of them, and can readily be removed.

This invention also comprehends the product produced by the above process, both the blank and the finished knife.

The above and other features of the invention will be fully understood from the following detailed description and the accompanying drawings, in which:

BRIEF DESCRIPTION OF THE DRAWINGS

FIG. 1 is a side view of a blank according to this invention;

FIG. 2 is a right hand end view of FIG. 1;

FIG. 3 is a side view of a knife according to this invention;

FIG. 4 is a bottom view of FIG. 3;

FIGS. 5–12 illustrate successive steps in the method of this invention, and

DETAILED DESCRIPTION OF THE INVENTION

Figure 7:
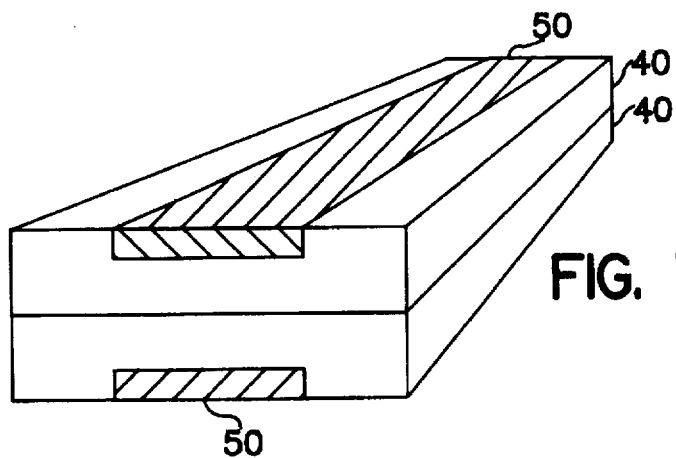
Figure 8:
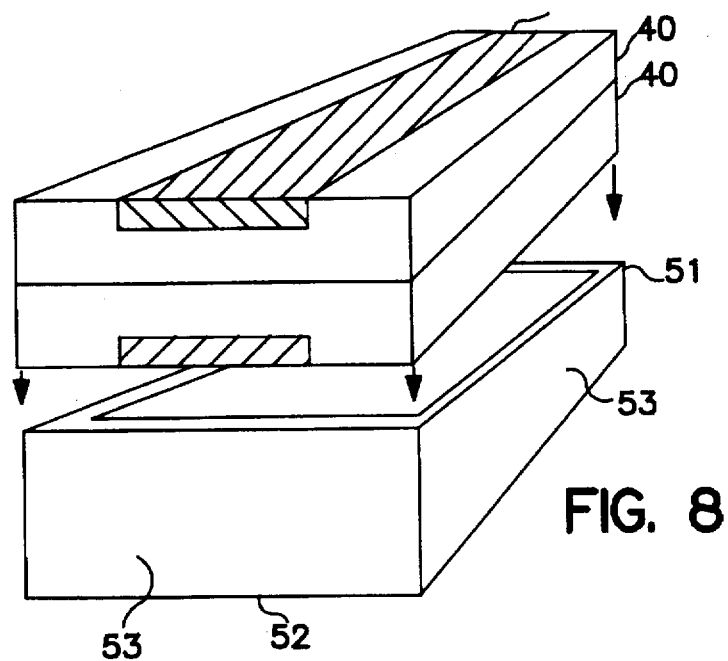
Figure 9:
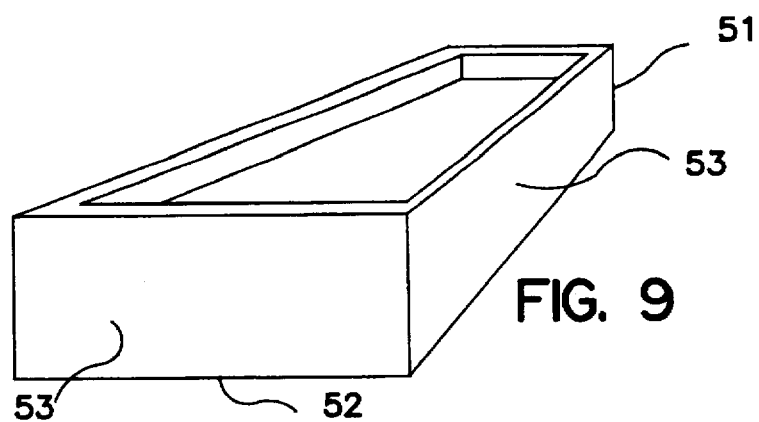

The purpose of this invention is to produce a knife blank 20 as shown in FIGS. 1 and 2, and from that blank to produce a knife 21 as exemplified in FIGS. 3 and 4.

Blank 20 has a steel base 25, and a step 26. The step is filled with a layer 27 of sintered Fe/TiC bonded to the base 28 of the step.

Knife 21 has been machined from blank 20 to a configuration useful for a cutting knife. Mounting holes 30, 31 have been drilled, and the exterior edges shaped to fit an intended installation. The Fe/TiC body will have been ground to form a cutting edge 32. In the course of grinding the edge, some substrate material will also have been ground away, as shown by line 33 in FIG. 3.

Knife 21 is useful for cutting strands of plastic emerging from a die face, as shown in the said Vela patent. Its own surface slides easily over the die face. More to the point of this invention, the Fe/TiC material is strongly bonded to the metal substrate. It is small relative to the structure to which it is bonded. Breakage due to brittleness is nearly entirely eliminated, because there is no long unsupported length of Fe/TiC such as exists in knives which are made entirely from that material.

Blank 20 is produced by the process shown in FIGS. 5–12. Steel substrate halves 40 have a base face 41, two side walls 42,43, and an upper face 44 extending between their two ends. A groove 45 extends along the upper face. It has a base 46 and two shoulders 47,48.

Two substrate halves are placed with their base faces toward one another (FIG. 6). Optionally a layer 49 of ceramic material will be placed between them to facilitate their separation after the HIP process.

As shown in FIG. 7, a charge 50 Fe/TiC material is placed in both grooves.

Next (FIG. 8), this assembly is loaded into the bottom of a metal container 51 having a bottom 52 and four sides 53 which closely fit the assembly. A cover, not shown, is welded to the upper edge of the container. The container is evacuated and sealed closed. It is then subjected to HIP, which as described in the Vela patent, distorts the container and strongly compresses its contents, while heat is also applied. After the HIP processing, the contents are cooled and removed.

Then the container is machined away such as by grinding and milling. When a ceramic layer is used, the halves ape readily separated. Otherwise they must be cut apart such as by sawing them, because the temperature and pressure of the HIP processing would have bonded them together.

Figure 10:
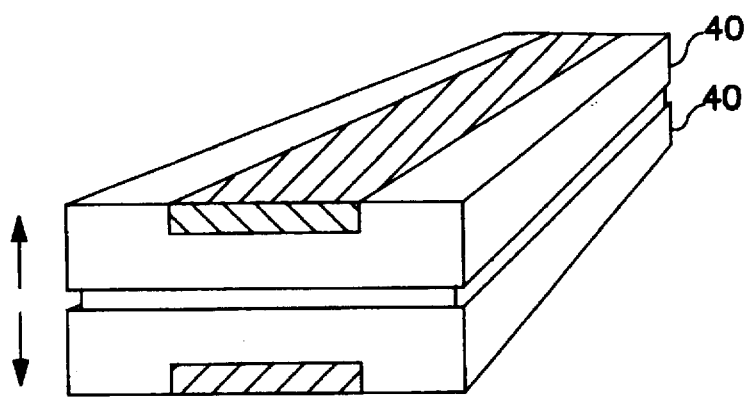
Figure 11:
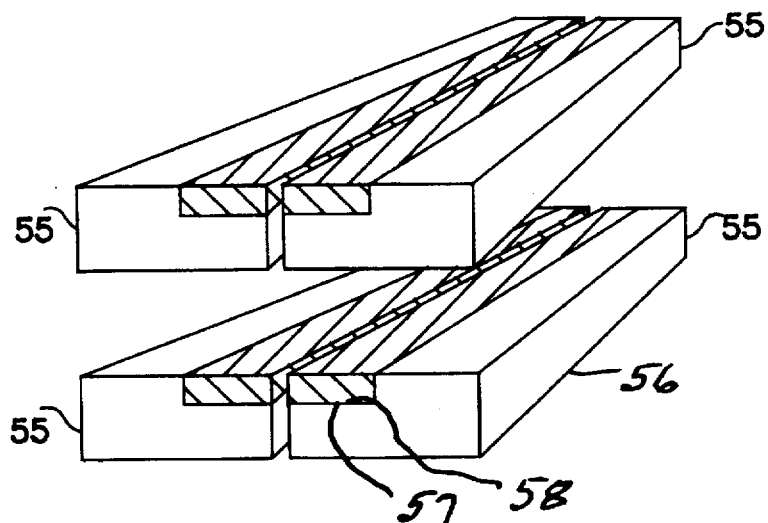
Figure 12:
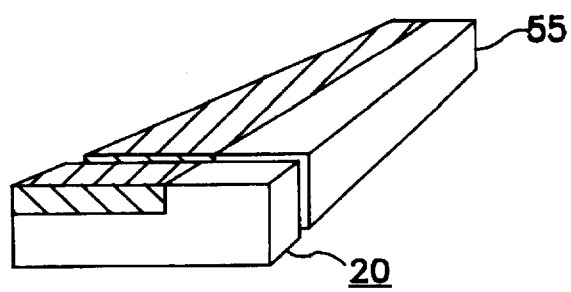

In whatever event, the halves ape separated as shown in FIG. 10.

Next they are cut into strips 55. These strips comprise a length 56 of metal substrate with a length 57 of sintered FE/TiC bonded in a step 58.

Thereafter, strips 55 are sliced to form individual blanks 20.

As previously stated, the blanks will now be machined by conventional methods to produce knives 21.

A suitable metal for the substrate is 15-5 PH stainless steel.

Suitable Fe/TiC materials are available from Alloy Technology International, Inc. of 169 Western Highway, West Nyack, N.Y. 10994 under its trademark Ferro-TiC. A preferred example of such a material comprises by weight percentage, about 30–32% TiC, 9–10% Cr, 3–6.5% Ni, 2–4% Mo, 0–1% Al, 1–2% ti, 0–1% Cu, 40–50% Fe. Variations of this material, especially the relative percentages of TiC and matrix are available and suitable, so along as the matrix can be diffusion bonded to the substrate steel.

Figure 13:
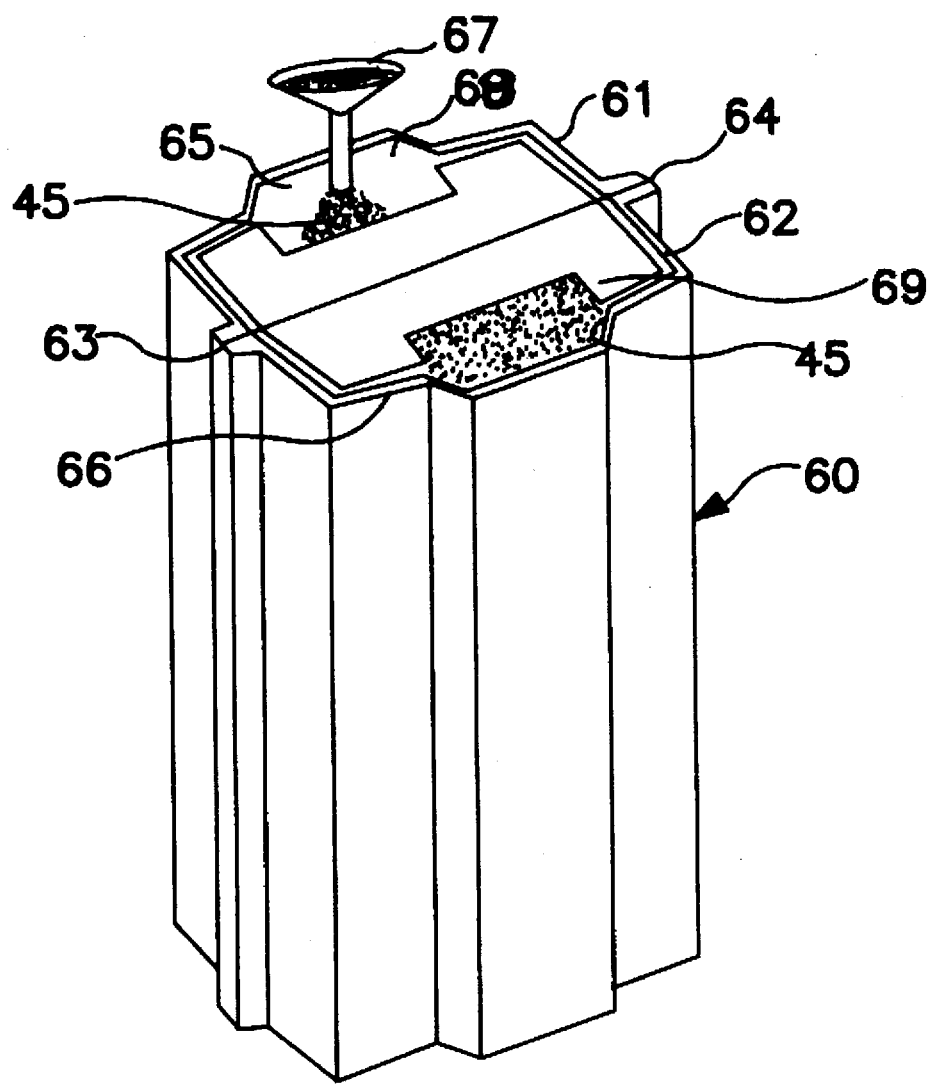
FIG. 13 is a perspective view of a variation on the method of this invention.

FIG. 13 shows a useful variation of the method, in which the loading of the Fe/TiC powder is greatly simplified, and a more readily machined product from the HIP process is produced. Except for the shape of its container, and the method of loading the TiC, the methods are identical.

A container 60 includes two parts 61, 62 which are identical. Flanges 63, 64 are welded together to form a prismatic shape. Recesses 65, 66 are formed in these parts, centrally located over grooves 45 in the substrates. FIG. 13 shows TiC powder 67 being loaded into the channels 68, 69 formed by the container and the substrates. It will be vibrated to settle, but need not be tightly compacted. End plates (not shown) will be welded to the parts to close the ends. As before the closed container will be evacuated and sealed closed.

It may be convenient to tack weld the substrates together for ease in handling.

Thereafter the processing is the same as previously discussed. However, the HIP will deflect the central portions of the parts to compress and sinter the powder. The subsequent product is substantially the same as previously described.

This invention is not to be limited by the embodiments shown in the drawings and described in the description, which are given by way of example and not of limitation, but only in accordance with the scope of the appended claims.

We claim:

1. A method for producing a composite blank for a knife blade comprising the following steps:

(a) forming a pair of metal substrate halves, each having two ends, a base face, two side walls, a top face, and a groove formed in the top face forming two parallel shoulders extending between the ends;

(b) placing the substrate halves with their base faces facing each other;

(c) filling the grooves with a charge of Fe/TiC powder suitable for sintering and for bonding with the metal substrate halves;

(d) loading the substrate halves and charges into a closely-fitting metal container and closing the container;

(e) evacuating and sealing the container;

(f) subjecting the container to elevated temperatures and pressure in a HIP process to produce substrate halves with a sintered body of said power bonded thereto;

(g) after the HIP process, removing the container;

(h) separating the two substrate halves from one another;

(i) producing two parts from each substrate half by cutting through said substrate and sintered body of powder along the groove, each part having one of said shoulders; and (j) slicing the parts from step (i) into blanks.

2. A method according to claim 1 in which a ceramic separator layer is placed between said halves before sealing the container.

3. A method according to claim 1 in which said substrate halves and charges when loaded in step (d) form a body which is geometrically symmetrical.

4. A method for making a cutting knife comprising, after the steps of claim 1, mechanically shaping a cutting edge on the sintered and bonded Fe/TiC powder.

5. A method according to claim 1 in which said container has two sides, each of said side facing a respective one of said grooves, each of said sides having a channel overlaying a respective said groove into which grooves and channels said Fe/tiC powder is charged, said sides when subjected to HIP deflecting to compress said powder into and in said grooves.

6. A method according to claim 5 in which a ceramic separator layer is placed between said halves before sealing the container.

7. A method according to claim 5 in which the said substrate halves and charges when loaded in step (d) form a body which is geometrically symmetrical.

8. A method for making a cutting knife comprising, after the step of claim 5 mechanically shaping a cutting edge on the sintered and bonded Fe/TiC powder.

* * * * *